United States Patent
Tamezane et al.

(10) Patent No.: US 8,042,367 B2
(45) Date of Patent: Oct. 25, 2011

(54) TUMBLER-TYPE KEY VERIFICATION SYSTEM

(75) Inventors: Takumi Tamezane, Aichi (JP);
Yoshiyuki Seki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 67 days.

(21) Appl. No.: 12/244,486

(22) Filed: Oct. 2, 2008

(65) Prior Publication Data
US 2009/0090150 A1    Apr. 9, 2009

(30) Foreign Application Priority Data

Oct. 4, 2007  (JP) ................................. 2007-261268

(51) Int. Cl.
*E05B 21/00* (2006.01)
(52) U.S. Cl. ................. 70/352; 70/387; 70/409
(58) Field of Classification Search .............. 70/352, 70/387, 405, 419, 409, 345, 350, DIG. 1, 70/DIG. 2, DIG. 47, DIG. 78, DIG. 80
See application file for complete search history.

(56) References Cited

U.S. PATENT DOCUMENTS

| | | | | |
|---|---|---|---|---|
| 1,224,021 A | * | 4/1917 | Renaux | 70/365 |
| 1,989,327 A | * | 1/1935 | Machinist | 70/493 |
| 2,049,548 A | * | 8/1936 | Swanson | 70/493 |
| 3,640,107 A | * | 2/1972 | Litvin | 70/129 |
| 3,943,739 A | * | 3/1976 | Genakis | 70/419 |
| 3,974,670 A | * | 8/1976 | Wolter | 70/493 |
| 4,683,740 A | * | 8/1987 | Errani | 70/419 |
| 5,291,766 A | * | 3/1994 | Eisermann | 70/276 |
| 5,469,723 A | * | 11/1995 | Litwin et al. | 70/107 |
| 6,220,066 B1 | * | 4/2001 | Haggstrom | 70/352 |
| 7,131,301 B1 | * | 11/2006 | Chang | 70/134 |
| 7,956,741 B2 | * | 6/2011 | Tamezane et al. | 340/542 |
| 2004/0237613 A1 | | 12/2004 | Shimura et al. | |

FOREIGN PATENT DOCUMENTS

| | | |
|---|---|---|
| CN | 2227175 Y | 5/1996 |
| CN | 1572997 A | 2/2005 |
| JP | 3090369 | 12/2002 |
| JP | 2004-076375 | 3/2004 |

* cited by examiner

*Primary Examiner* — Lloyd Gall
(74) *Attorney, Agent, or Firm* — Patterson Thuente Christensen Pedersen, P.A.

(57) ABSTRACT

A tumbler-type key verification system including a tumbler-type key and a lock apparatus. The lock apparatus includes a support member, a movable member movable relative to the support member, tumblers which are biased by tumbler springs and are arranged to engage with the support member and the movable member, and a lock mechanism that reinforces the locking strength of the tumblers. The lock mechanism having a two-piece structure including a first piece movably accommodated in the movable member and a second piece movably accommodated in the support member. The lock mechanism reinforces the locking strength of the tumblers by having the first piece or the second piece engage both the movable member and the support member before the tumbler-type key is inserted into the lock apparatus or when the tumbler-type key is being inserted into the lock apparatus.

9 Claims, 10 Drawing Sheets

Fig.2
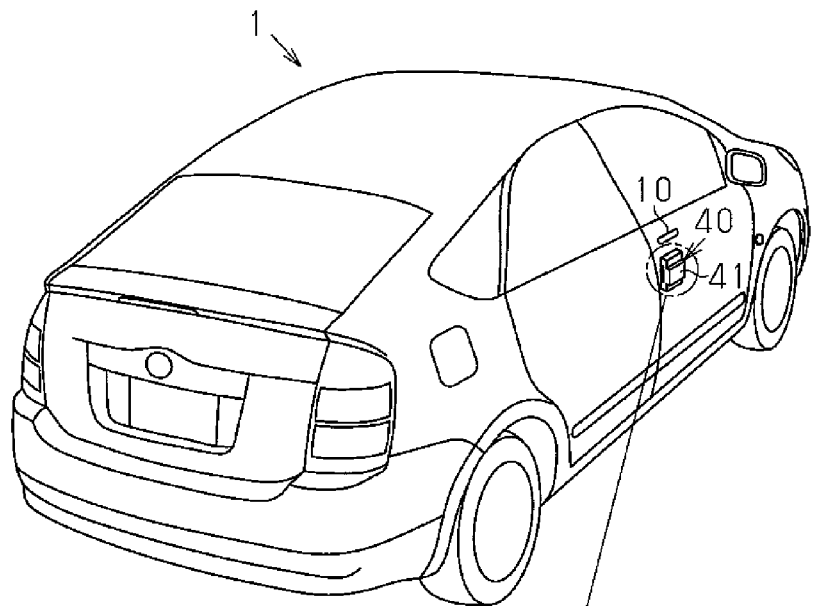
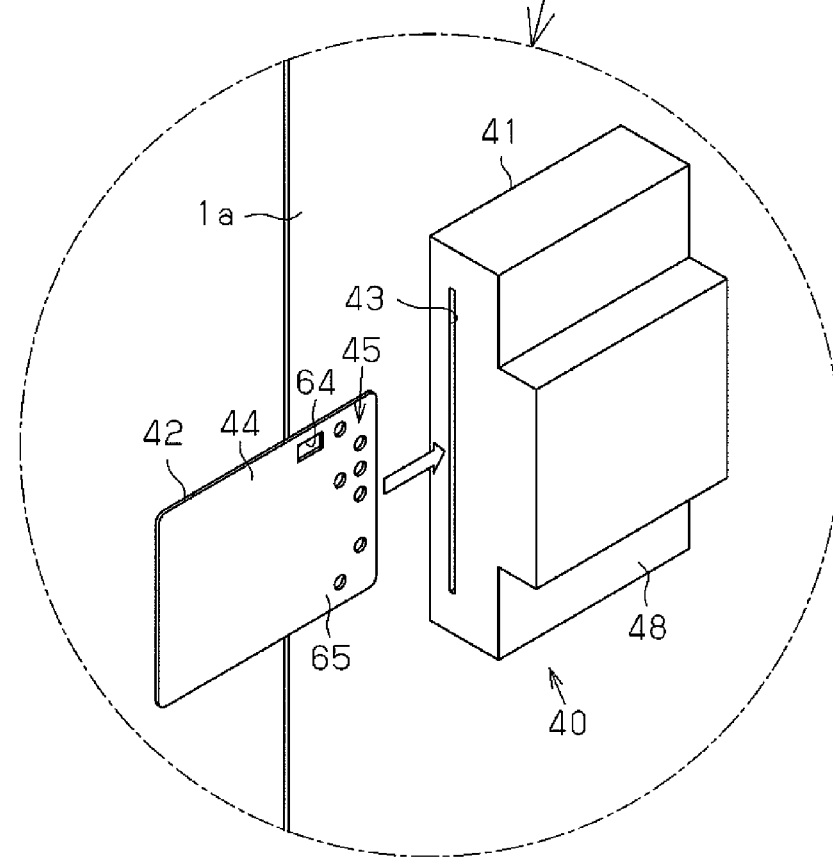

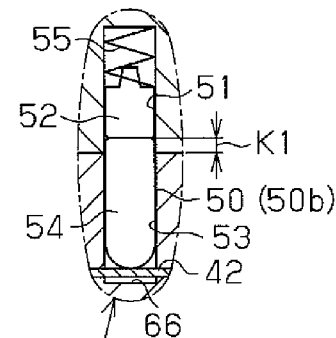
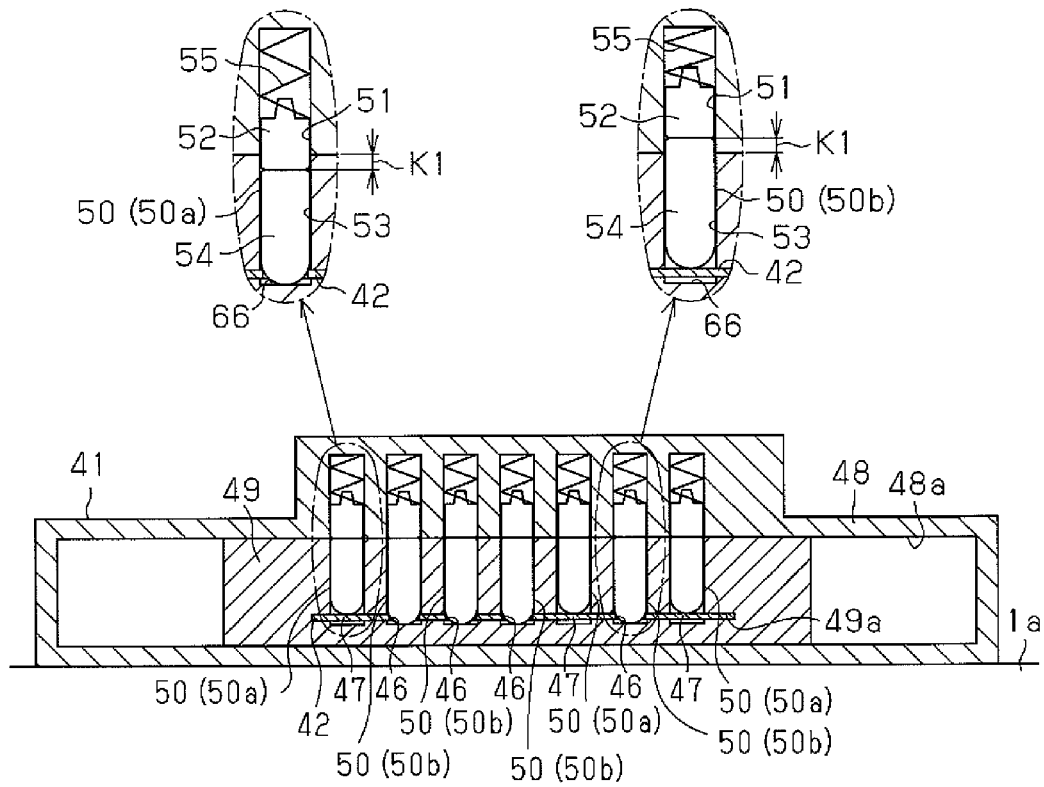
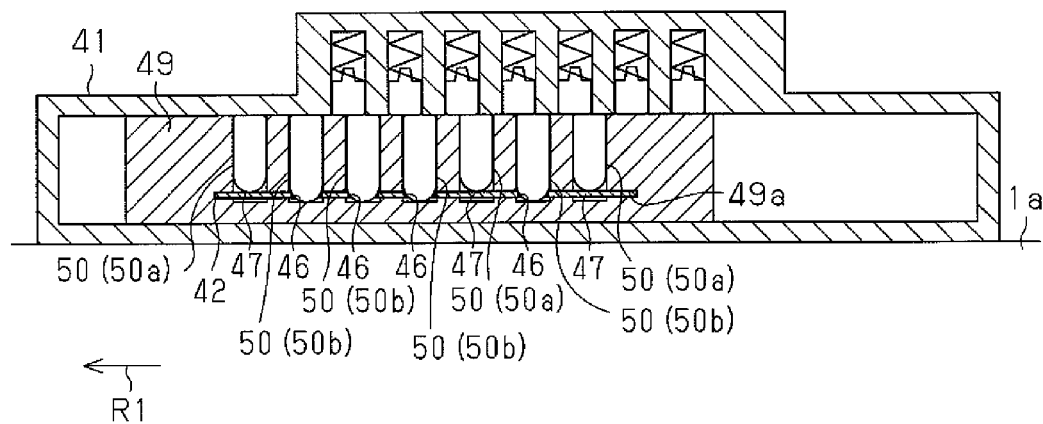

TUMBLER-TYPE KEY VERIFICATION SYSTEM

CROSS-REFERENCE TO RELATED APPLICATIONS

This application is based upon and claims the benefit of priority from prior Japanese Patent Application No. 2007-261268, filed on Oct. 4, 2007, the entire contents of which are incorporated herein by reference.

BACKGROUND OF THE INVENTION

The present invention relates to a tumbler-type key verification system for use with a tumbler-type key including a code pattern region having an array of recessed portions that expresses a key code of the tumbler-type key, in which the lock apparatus verifies the key code.

In the prior art, various types of key systems are used to prevent unauthorized use of articles, doors, and the like by a third person. A typical key system uses a key that includes a grip and an elongated key plate (also referred to as a key blade), which has an engraved key code. Insertion of the key plate into a cylinder of a lock apparatus aligns the engraved key code with a plurality of disk tumblers (small steel pieces), which are biased by a spring arranged in the cylinder. Rotation of the cylinder with the key is permitted when the key code of the key plate matches a key shape formed by the disk tumblers. In such a case, the opening and closing of the lock apparatus is enabled.

Japanese Utility Model Registration No. 3090369 and Japanese Laid-Open Patent Publication No. 2004-76375 describe examples of a card key system using a card key. FIG. 16 illustrates a card key system 81. The card key system 81 includes a card key 82 and a lock apparatus 86. The card key 82 has a code region 83 including an array of holes 84 that expresses a key code of the card key 82.

FIG. 17 illustrates the lock apparatus 86 (also referred to as a fixed component) in a state in which the card key 82 is not inserted therein. The lock apparatus 86 includes a supporting component 90 and a movable component 88 supported by the supporting component 90. The movable component 88 moves relative to the supporting component 90 when the card key 82 is inserted into the lock apparatus 86 to perform a key operation. The movable component 88 and the supporting component 90 may be referred to as the movable side and fixed side, respectively. A plurality of pin tumblers 87 are arranged so as to extend in the movable component 88 and the supporting component 90. Each pin tumbler 87 includes a lock pin 89 accommodated in the movable component 88 and a plunger pin 91 accommodated in the supporting component 90. The plunger pin 91 is biased towards the lock pin 89 by a tumbler spring 92. The plurality of pin tumblers 87 include first pin tumblers 87a and second pin tumblers 87b. In each first pin tumbler 87a, the plunger pin 91 is engaged with both of the movable component 88 and the supporting component 90 when the card key 82 is not inserted to the lock apparatus 86. In each second pin tumbler 87b, a shear line between the lock pin 89 and the plunger pin 91 is aligned with a shear line between the movable component 88 and the supporting component 90 when the card key 82 is not inserted into the lock apparatus 86.

As illustrated in FIG. 18, when the proper card key 82 is inserted into the lock apparatus 86, the shear line between the lock pin 89 and the plunger pin 91 is aligned with the shear line between the movable component 88 and the supporting component 90 in each of the pin tumblers 87 (first pin tumblers 87a and second pin tumblers 87b). This permits movement of the movable component 88 with respect to the supporting component 90 so that closing and opening of the lock apparatus 86 becomes possible.

As illustrated in FIG. 19, if the card key 82 inserted into the lock apparatus 86 is an improper key, the holes 84 of the card key 82 may be aligned with the first pin tumblers 87a, and the second pin tumblers 87b may be aligned with non-hole portions 85 of the card key 82. In such a first pin tumbler 87a, the plunger pin 91 may be lowered by the amount the distal end of the lock pin 89 is accommodated in the hole 84. Thus, the plunger pin 91 would be engaged with both of the movable component 88 and the supporting component 90. In such a second pin tumbler 87b, the distal end of the lock pin 89 may be lifted by a non-hole portion 85 of the card key 82. Thus, the lock pin 89 would be engaged with both of the movable component 88 and the supporting component 90. As a result, the pin tumblers 87 prohibit movement of the movable component 88 relative to the supporting component 90. Thus, the opening and closing of the lock apparatus 86 cannot be performed with the improper key.

[Patent Document 1] Japanese Utility Model Registration No. 3090369

[Patent document 2] Japanese Laid-Open Patent Publication No. 2004-76375

SUMMARY OF THE INVENTION

Each pin tumbler 87 is moved upward or downward by an amount corresponding to the thickness of the card key 82 when the card key 82 is inserted into or removed from the lock apparatus 86. The distance of the upward and downward movement of the pin tumbler 87 is small if the card key 82 is thin.

The present invention also provides a tumbler-type key verification system that prevents unauthorized opening and closing of a lock apparatus.

One aspect of the present invention is a tumbler-type key verification system including a tumbler-type key and a lock apparatus. The tumbler-type key has a code pattern region including an array of one or more recessed portions and one or more non-recessed portions that expresses a key code. The tumbler-type key is insertable into the lock apparatus. The lock apparatus includes a support member and a movable member movable relative to the support member. A plurality of tumblers are arranged to be engageable with the support member and the movable member. The plurality of tumblers each correspond to one of the one or more recessed portions or one of the one or more non-recessed portions during insertion of the tumbler-type key. A plurality of code-verification biasing members bias the plurality of tumblers, respectively. The tumbler-type key verification system performs verification of the tumbler-type key based on whether the plurality of tumblers are engaged with the support member and the movable member during insertion of the tumbler-type key. The tumbler-type key verification key system further includes at least one lock mechanism for reinforcing the locking strength of the tumblers. The at least one lock mechanism includes a lock piece having a two-piece structure including a first piece movably accommodated in the movable member and a second piece movably accommodated in the support member. A lock reinforcement biasing member biases the lock piece. The at least one lock mechanism reinforces the locking strength of the tumblers by having the first piece or the second piece engage both the movable member and the support member during at least either one of a state before the tumbler-type key is inserted into the lock apparatus and a state during which the tumbler-type key is being inserted into the lock apparatus.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a perspective view of a lock apparatus and a card key for a mechanical operation type door lock system;

FIG. 5(a) is a cross-sectional view of the lock apparatus together with a proper card key, and FIGS. 5(b) and 5(c) are partial enlarged views of the lock apparatus together with an improper card key;

FIG. 6 is a cross-sectional view of the lock apparatus when opened by the card key;

DETAILED DESCRIPTION OF THE PREFERRED EMBODIMENTS

A preferred embodiment of a tumbler-type key verification system according to the present invention will now be discussed.

Figure 1:
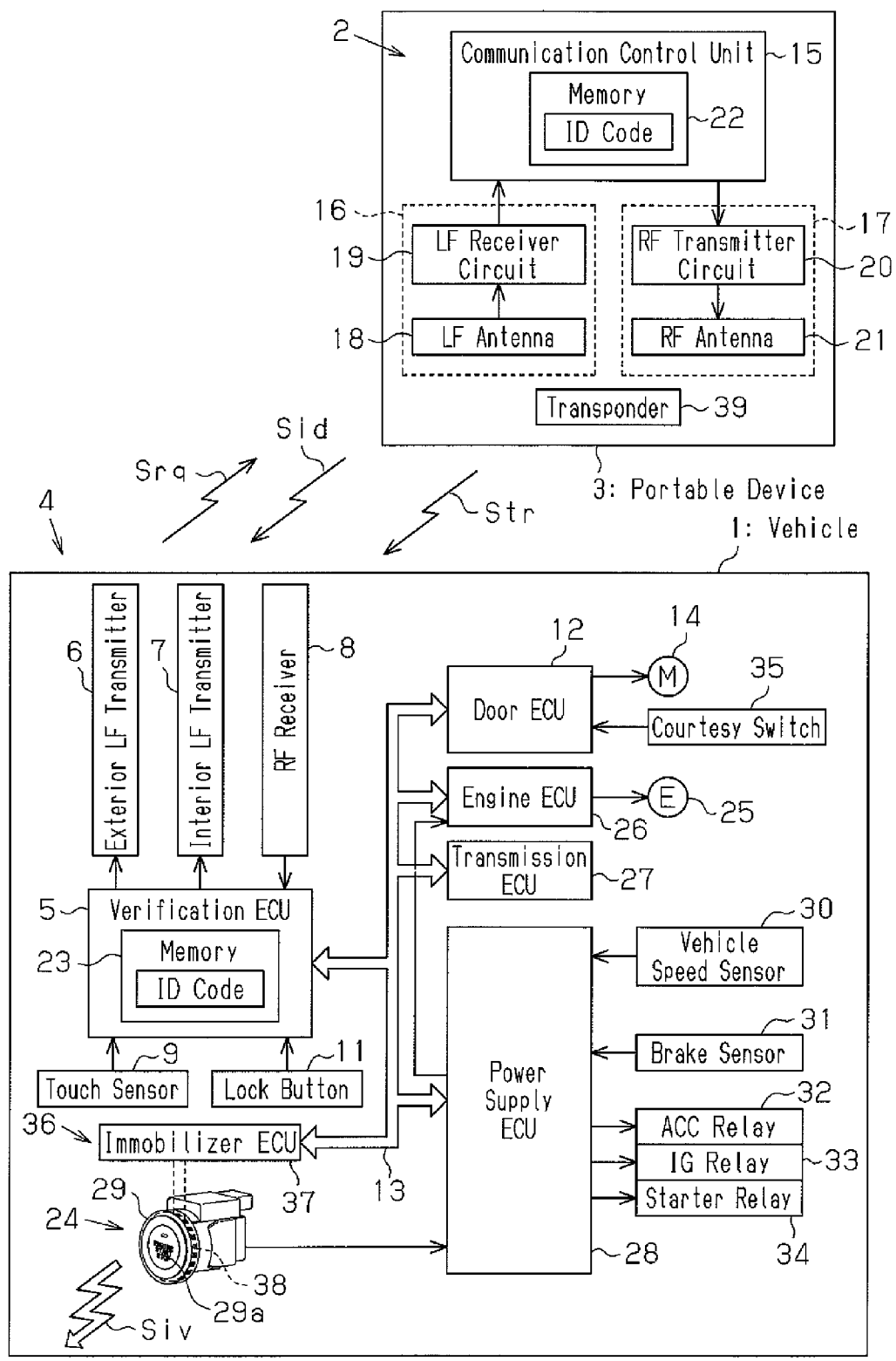
FIG. 1 is a block diagram of a key operation-free system.

As illustrated in FIG. 1, a vehicle 1 incorporates a key operation-free system 2 that performs vehicle operations including the locking and unlocking of the doors and the starting and stopping of the engine without physically operating a vehicle key. The key operation-free system 2 uses a vehicle key (hereinafter referred to as portable device 3) that transmits a unique ID code (key code) through wireless communication. In the key operation-free system 2, the vehicle 1 transmits a request signal Srq requesting the ID code. The portable device 3 returns an ID signal Sid including the ID code to the vehicle 1 through narrow-band wireless communication in response to the request signal Srq. If the ID code of the portable device 3 matches an ID code of the vehicle 1, the key operation-free system 2 enables the locking and unlocking of the door and the starting and stopping of the engine. The key operation-free system 2 is one example of an electronic key system. The portable device 3 is one example of an electronic key.

The key operation-free system 2 incorporates a smart entry system 4 that locks and unlocks the doors without any physical operation of the vehicle key. The smart entry system 4 will now be described. The vehicle 1 includes a verification ECU 5 for verifying the ID code of the portable device 3 in the ID signal Sid received through narrow-band wireless communication. The verification ECU 5 is connected to a vehicle exterior LF transmitter 6, a vehicle interior LF transmitter 7, and an RF receiver 8. The vehicle exterior LF transmitter 6 is arranged in each door of the vehicle 1 to transmit a long frequency (LF band) signal out of the vehicle through wireless communication. The vehicle interior LF transmitter 7 is arranged in the vehicle (e.g., in the floor etc.) to transmit a LF band signal within the vehicle through wireless communication. The RF receiver 8 is arranged in the vehicle (e.g., in the rearview mirror etc.) to receive an RF band signal through wireless communication. The LF transmitters 6 and 7 transmit the request signal Srq through wireless communication. Specifically, the vehicle exterior LF transmitter 6 forms a communication area (vehicle exterior communication area) for the request signal Srq around the vehicle. The vehicle interior LF transmitter 7 forms a communication area (vehicle interior communication area) for the request signal Srq throughout the entire vehicle interior.

The verification ECU 5 is connected to a touch sensor 9 arranged, for example, in a door handle at the outer side of the vehicle. The touch sensor 9 detects a person touching the door handle 10 when the door is locked to unlock the door. The verification ECU 5 is connected to a lock button 11 arranged in, for example, the door handle 10. The lock button 11 is pushed to lock the unlocked door. The verification ECU 5 is connected to a door ECU 12, which controls the locking and unlocking of the door though an in-vehicle LAN 13. The door ECU 12 locks or unlocks the door by driving a door lock motor 14 in accordance with a command from the verification ECU 5.

The portable device 3 includes a communication control unit 15 for controlling wireless communication that is performed with the vehicle 1. The communication control unit 15 is connected to an LF reception unit 16, which receives an LF band signal, and an RF transmission unit 17, which transmits an RF band signal in accordance with a command from the communication control unit 15. The LF reception unit 16 demodulates an LF band signal, which is received by an LF reception antenna 18 in an LF receiver circuit 19, and provides the demodulated signal to the communication control unit 15 as received data. The RF transmission unit 17 modulates transmission data provided from the communication control unit 15 with an RF transmitter circuit 20, generates the ID signal Sid in the REF band with the unique ID code of the portable device 3, and transmits the ID signal Sid from an RF transmission antenna 21.

When the vehicle 1 is in a parked state (engine stopped and doors locked), the verification ECU 5 intermittently transmits the request signal Srq in the LF band to the vehicle exterior LF transmitter 6 and forms the vehicle exterior communication area around the vehicle. When the portable device 3 enters the vehicle exterior communication area and receives the request signal Srq with the LF reception unit 16, the portable device 3 transmits the ID signal Sid containing the ID code registered in a memory 22 to the RF transmission unit 17 as the RF band wireless signal in response to the request signal Srq. In the verification ECU 5, the ID code of the portable device 3 contained in the ID signal Sid and received by the RF receiver 8 is verified with the ID code registered in a memory 23 (vehicle exterior verification). When the vehicle exterior verification is completed, the verification ECU 5 sets a vehicle exterior verification flag in the memory 23 over a fixed time period and activates the touch sensor 9 in a standby state during that time period. When the activated touch sensor 9 detects that the vehicle exterior door handle has been touched, the door ECU 12 unlocks the locked door by generating rotation with the door lock motor 14 in one direction.

In a state in which the vehicle 1 is not moving (engine stopped and door unlocked), the verification ECU 5 transmits the request signal Srq to the vehicle exterior LF transmitter 6 when detecting that the lock button 11 has been pushed. The verification ECU 5 performs the vehicle exterior verification on the ID signal Sid returned from the portable device 3 in response to the request signal Srq. The verification ECU 5 provides a door lock request to the door ECU 12 when the vehicle exterior verification is completed. The door ECU 12 locks the unlocked door by generating rotation with the door lock motor 14 in the other direction in response to the door lock request.

The key operation-free system 2 includes a one-push engine start system 24 enabling the starting and stopping of the engine by just operating a vehicle switch. Physical operation of the vehicle key is not necessary. The one-push engine start system 24 will now be described. The vehicle 1 includes an engine ECU 26 that executes ignition control and fuel injection control on an engine 25, a gearshift ECU 27 that controls automatic transmission according to the operation of a gearshift lever, and a power supply ECU 28 that executes power supply management for in-vehicle electrical components. The ECUs 26 to 28 are connected to various ECUs including the verification ECU 5 through the in-vehicle LAN 13.

An engine switch 29, which is operated when switching the power supply state of the vehicle 1, is arranged near the driver's seat in the vehicle 1. The engine switch 29 is of a push-operation type and includes a switch portion 29a that is push. The engine switch 29 is connected to the power supply ECU 28 by a harness. The engine switch 29 has an engine starting and stopping operation function, which switches the engine 25 to a started state or a stopped state, and a power supply transition operation function, which switches the power supply state of the vehicle 1 to an OFF state, an ACC ON state, or an IG ON state.

The power supply ECU 28 is connected to a vehicle speed sensor 30, which detects the travel speed of the vehicle 1, and a brake sensor 31, which detects the depression amount of the brake pedal. The power supply ECU 28 recognizes the current traveling speed of the vehicle 1, which is based on the vehicle speed information from the vehicle speed sensor 30, and determines depression of the brake pedal, which is based on the pedal depression amount information from the brake sensor 31. The power supply ECU 28 is connected to an ACC relay 32, which is connected to various in-vehicle accessories, an IS relay 33, which is connected to the engine ECU 26, and a starter relay 34, which is connected to a starter motor of the engine 25.

After the vehicle exterior verification is completed and the door is unlocked, the verification ECU 5 recognizes with a courtesy switch 35 that the driver is entering the vehicle as the door opens. The verification ECU 5 forms the vehicle interior communication area in the entire vehicle interior by transmitting the request signal Srq to the vehicle interior LF transmitter 7. When receiving the ID signal Sid in response from the portable device 3, which is located in the vehicle interior communication area, with the RF receiver 8 (vehicle interior verification), the verification ECU 5 verifies the ID code of the portable device 3 contained in the ID signal Sid with the ID code registered in the verification ECU 5. The verification ECU 5 sets a vehicle interior verification completion flag in the memory 23 when the vehicle interior verification is completed.

When the driver pushes the engine switch 29 to switch the power supply state of the vehicle 1, the power supply ECU 28 first checks the verification ECU 5 and determines whether the vehicle interior verification has been completed. The power supply ECU 28 recognizes that the vehicle interior verification has been completed when notified by the verification ECU 5 that the vehicle interior verification has been completed. When notified by the verification ECU 5 that the vehicle interior verification ha not been satisfied, the power supply ECU 28 instructs the verification ECU 5 to re-execute the vehicle interior verification and re-check whether the vehicle interior verification has been completed. The power supply ECU 28 continues to determine that the vehicle interior verification has not been completed even after the verification ECU 5 re-executes the vehicle interior verification unless notified by the verification ECU 5 that the vehicle interior verification has been completed.

When the engine switch 29 is pushed in a state in which the brake pedal is depressed and the engine 25 is stopped, the power supply ECU 28 activates the three relays 32 to 34 to start the engine 25 as long as the vehicle interior verification is satisfied and then outputs an activation signal to the engine ECU 26. When receiving the activation signal, the engine ECU 26 checks the result of the vehicle interior verification and then checks whether the verification ECU 5 and the engine ECU 26 are a proper pair by performing pairing through encryption communication. If the two conditions are satisfied, the engine ECU 26 initiates the ignition control and the fuel injection control to start the engine 25. In a state in which the vehicle 1 stops moving (vehicle speed "0") and the engine switch 29 is pushed while the engine 25 is still running, the power supply ECU 28 deactivates all of the three relays 32 to 34 to stop the engine 25.

When the engine switch 29 is pushed but the brake pedal is not depressed in a situation in which the conditions are met of the engine 25 being stopped, the vehicle interior verification being completed, and the gearshift lever being at the P range position, the power supply ECU 28 sequentially shifts the power supply state in a manner of OFF state→ACC ON state→IG ON state→OFF state whenever the engine switch 29 is pushed. In the above situation, the power supply state of the vehicle 1 is switched from the OFF state to the ACC state when the engine switch 29 is pushed once. From this state, the power supply state of the vehicle 1 is switched to the IG ON state when the engine switch 29 is pushed again once. From this state, the power supply state of the vehicle 1 returns to the OFF state when the engine switch 29 is pushed again once.

The vehicle 1 includes an immobilizer system 36 for performing wireless ID verification using a communication tag component incorporated in the portable device 3. The immobilizer system 36 includes an immobilizer ECU 37. The immobilizer ECU 37 includes a CPU and a memory and is connected to the in-vehicle LAN 13. The immobilizer ECU 37 is connected to a transponder key coil 38, which functions as a vehicle antenna for the immobilizer system 36. The transponder key coil 38 is wound around a switch portion 29a in the housing of the engine switch 29. The portable device 3 incorporates a transponder (also referred to as communication tag component) for transmitting the unique ID code number.

The immobilizer system 36 will now be described. A drive radio wave Siv is transmitted from the transponder key coil 38 by arranging the portable device 3 near the transponder key coil 38. The drive radio wave Siv activates a transponder 39 in the portable device 3 so that the portable device 3 returns a transponder code signal Str in response. The immobilizer ECU 37 performs ID verification (immobilizer verification) on a code number included in the transponder code signal Str. To start the engine 25 by pushing the engine switch 29, completion of the vehicle interior verification is checked as an authentication operation. When conducting this check, there may be a condition in which the key operation-free system 2 is used and the ID verification is completed (vehicle interior verification is completed) or in which the ID verification is completed when using either the key operation-free system 2 or the immobilizer system 36.

A mechanical operation type door lock system 40 illustrated in FIG. 2 will now be discussed. The mechanical operation type door lock system 40 is advantageous when a physical key operation with a mechanical key becomes necessary to lock or unlock the doors. Since the key operation-free system 2 is of an electrical type, a door cannot be locked or unlocked by the key operation-free system 2 if the key operation-free system 2 fails to function or if battery drainage occurs in the portable device 3. The mechanical operation type door lock system 40 is used to enable the locking and unlocking of the doors under such situation.

The mechanical operation type door lock system 40 includes a lock apparatus 41, which is attached to an outer wall of the vehicle door (driver's seat door) 1a, and a mechanical key 42. The mechanical key 42 is inserted into the lock apparatus 41 and physically operated to open (unlock state) or close (lock state) the lock apparatus 41. In the preferred embodiment, the mechanical key 42 is of a card type (flat plate-shape) and is thus also referred to as the card key 42. The mechanical operation type door lock system 40 may be referred to as a card key type door lock system. In a state in which the proper card key 42 is inserted into a key hole 43 of the lock apparatus 41, the door is locked by moving the card key 42 from the initial position in a first direction (e.g., upward direction). In a state in which the proper card key 42 is inserted into the key hole 43 of the lock apparatus 41, the door is unlocked by moving the card key 42 from the initial position in a second direction (e.g., downward direction). The card key 42 is one example of a tumbler-type key. The mechanical operation type door lock system 40 is one example of a tumbler-type key verification system.

The mechanical operation type door lock system 40 is used during an emergency such as when the smart entry system 4 fails to function or when battery drainage occurs in the portable device 3. The card key 42 is used as an emergency key during such an emergency. The card key 42 is flat and has a size similar to that of a typical credit card. Thus, the card key 42 can be carried in a wallet, a card case, and the like in the same manner as credit cards.

Figure 3:
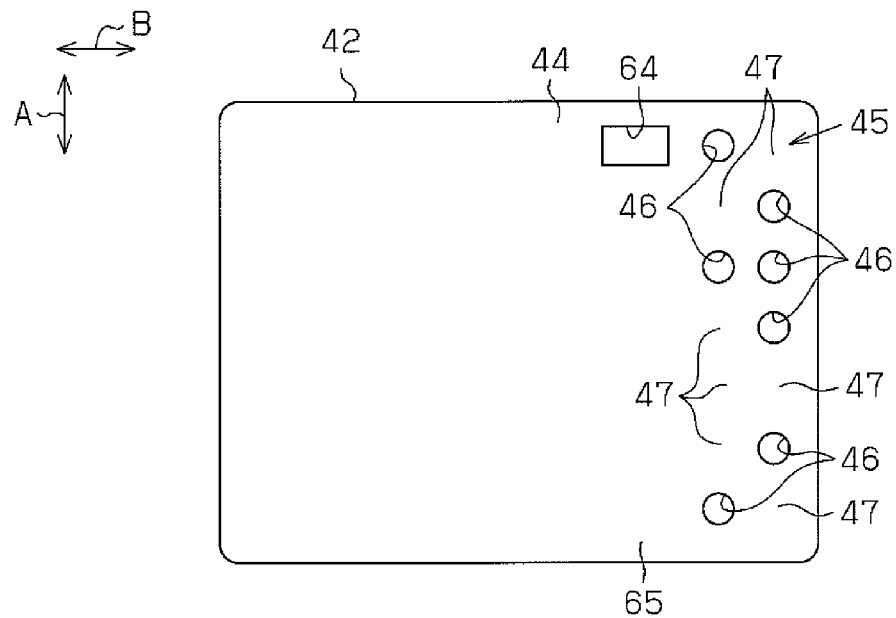
FIG. 3 is a plan view of the card key.

As illustrated in FIG. 3, a key body 44 (also referred to as case portion) of the card key 42 has a code pattern region 45. One or more holes 46 and one or more non-hole portions 47 are formed in the code pattern region 45. The array (pattern) of the holes 46 and the non-hole portions 47 in the code pattern region 45 expresses the key code for the mechanical key of the mechanical operation type door lock system 40. The holes 46 and the non-hole portions 47 are formed in the code pattern region 45 in the directions of arrows A and B of FIG. 3. In the example illustrated in FIG. 3, there are a total of fourteen (seven in each of the two rows) holes 46 and non-hole portions 47. The total number of the holes 46 and non-hole portions 47 is not limited to fourteen and may be changed in accordance with the required security level, the key and lock apparatus dimensions, cost, and the like. The code pattern region 45 is arranged near the distal end of the key body 44. Each hole 46 can be a round through hole, such as a punched hole, extending through the key body 44 but it does not necessary have to be round. The non-hole portions 47 may be projections. The holes 46 is one example of one or more recessed portions. The non-hole portions 47 is one example of one or more non-recessed portions.

As illustrated in FIGS. 4 to 9, the lock apparatus 41 includes a slider case 48. The slider case 48 is the body portion of the lock apparatus 41 and is box-shaped. The keyhole 43 (see FIG. 2) is formed in a side wall of the slider case 48. The slider case 48 is attached to the outer wall of the vehicle door 1a. A slider 49 is accommodated in an accommodating space 48a of the slider case 48 so as to be movable (linearly movable) relative to the slider case 48. The slider 49 is formed by a plate. The slider 49 is movable in an R1 direction (FIG. 6) and an R2 direction (FIG. 7) in the accommodating space 48a of the slider case 48. The slider case 48 is one example of a support member. The slider 49 is one example of a movable member. The slider case 48 may be referred to as fixed side of the lock apparatus 41, and the slider 49 may be referred to as a movable side of the lock apparatus 41.

A plurality of pin tumblers 50 are arranged between the slider case 48 and the slider 49 to fix the slider 49 to the slider case 48 and disable the locking and unlocking operation when the proper card key 42 is not used. The plurality of pin tumblers 50 each face one of the holes 46 or the non-hole portions 47 when the card key 42 is inserted into the lock apparatus 41. Thus, the number of pin tumblers 50 is the same as the total number of the holes 46 and non-hole portions 47 of the card key 42. The pin tumblers 50 is one example of tumbler members.

Each pin tumbler 50 includes a plunger pin 52, which is movably accommodated in a case side accommodation hole 51 formed in the slider case 48, and a lock pin 54, which is movably accommodated in a slider side accommodation hole 53 formed in the slider 49. The pin tumbler 50 is constantly biased toward the slider 49 by a tumbler spring 55 accommodated in the case side accommodation hole 51. The lock pin 54 is longer than the plunger pin 52. The lock pin 54 has a distal end of the lock pin 54 formed by a round surface, for example, a semispherical surface. The tumbler springs 55 is one example of code verification biasing members.

The pin tumbler 50 includes one or more first pin tumblers 50a, in which the lock pin 54 is short, and one or more second pin tumblers 50b, in which the lock pin 54 is long.

Figure 4:
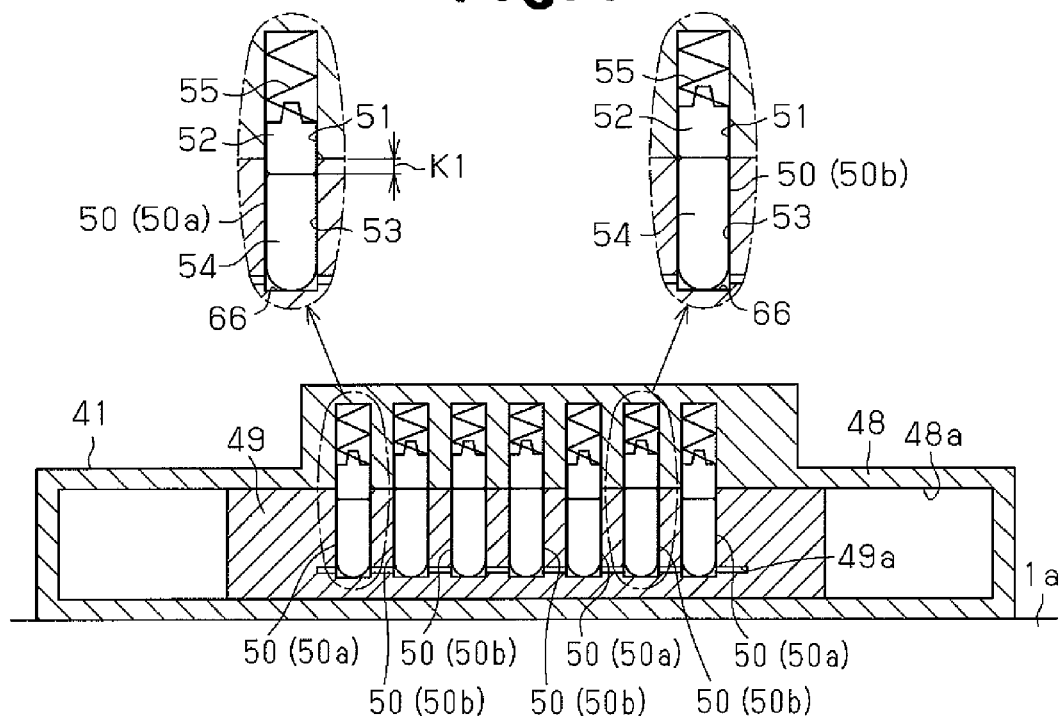
FIG. 4 is a cross-sectional view of the lock apparatus without the card key.

The first pin tumblers 50a are located at positions corresponding to the non-hole portions 47 of the proper card key 42 that is inserted into the lock apparatus 41. When the card key 42 is not inserted to the lock apparatus 41 as illustrated in the state of FIG. 4 or when the first pin tumblers 50a are forced into the holes 46 of an improper card key 42 as illustrated in the state of FIG. 5(b), the plunger pin 52 of each first pin tumbler 50a engages both the slider case 48 and the slider 49 over a constant engagement length K1 (pin tumbler engagement state) and restricts movement of the slider 49. When the proper card key 42 is inserted into the lock apparatus 41 as illustrated in the state of FIG. 5(a), the first pin tumblers 50a are moved upward by an amount corresponding to the engagement length K1 against the biasing force of the corresponding tumbler springs 55 by the non-hole portion 47 of the card key 42. The shear line between the plunger pin 52 and the lock pin 54 of each first pin tumbler 50a (shear line between the two components of the plunger pin 52) becomes aligned with the shear line between the slider case 48 and the slider 49 (slide surface of the slider 49) (pin tumbler disengagement state). The first pin tumblers 50a in the pin tumbler disengagement state do not function to restrict movement of the slider 49.

The second pin tumblers 50b are located at positions corresponding to the holes 46 of the proper card key 42 that is inserted into the lock apparatus 41. When the card key 42 is not inserted into the lock apparatus 41 as illustrated in the state of FIG. 4 or when the second pin tumblers 50b are forced into the holes 46 of the proper card key 42 as illustrated in FIG. 5(a), the shear line between the plunger pin 52 and the lock pin 54 of each second pin tumbler 50b is aligned with the shear line between the slider case 48 and the slider 49 (pin tumbler disengagement state). The second pin tumblers 50b in the pin tumbler disengagement state do not function to restrict movement of the slider 49. When an improper key is inserted into the lock apparatus 41 as illustrated in the state of FIG. 5(c), the second pin tumblers 50b are forced upward against the biasing force of the corresponding tumbler springs 55 by the non-hole portions 47. The second pin tumblers 50b engage both the slider case 48 and the slider 49 (pin tumbler engagement state) and restrict movement of the slider 49. The lift amount of each second pin tumbler 50b is the engagement length K1 of the lock pin 54 in each second pin tumbler 50b. The pin tumblers 50a and 50b are one example of tumbler members.

Figure 7:
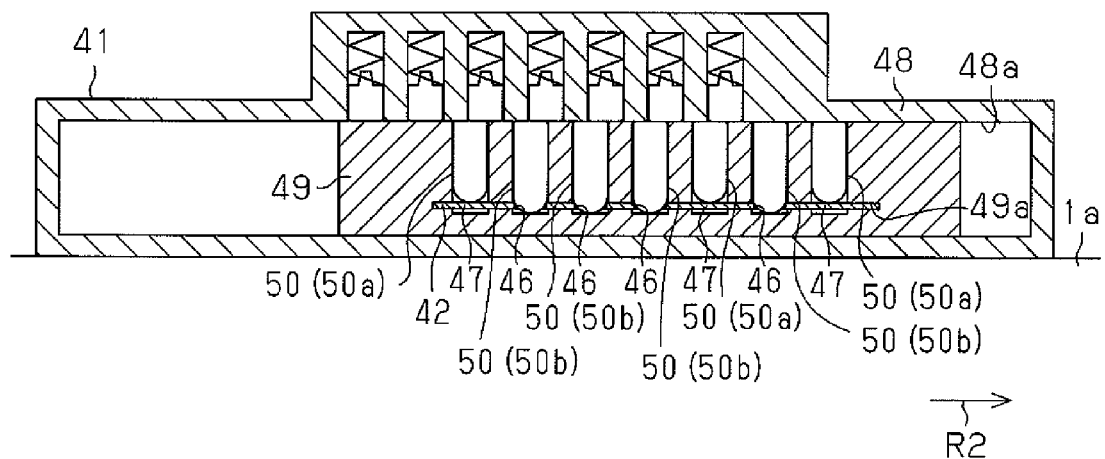
FIG. 7 is a cross-sectional view of the lock apparatus when closed by the card key.
Figure 8:
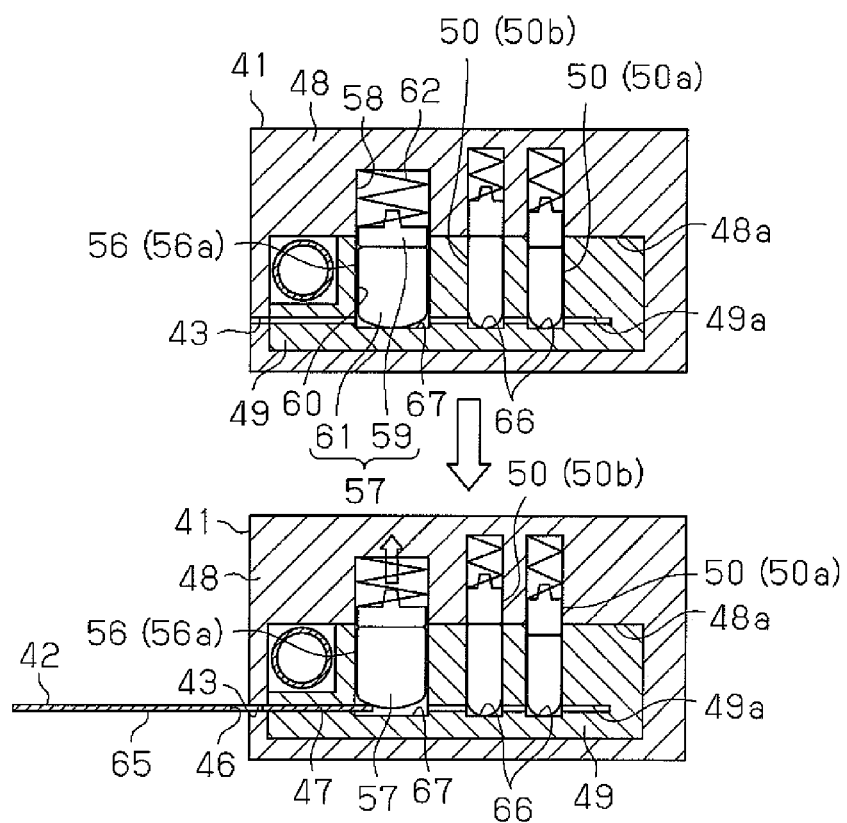
FIG. 8 is a cross-sectional view of a first lock piece in states before and during insertion of the card key.

The slider 49 is connected to a dead bolt (not illustrated) or the door lock member of the vehicle door 1a by a transmission mechanism (not illustrated). The transmission mechanism transmits and converts the movement of the slider 49 to the mechanical opening and closing of the dead bolt. Referring to FIGS. 7 and 8, when the card key 42 is inserted to the lock apparatus 41, the slider 49 becomes movable in two directions from a neutral position. When the slider 49 is moved in one direction (direction of arrow R1 in FIG. 6) from the neutral position, the transmission mechanism converts the movement of the slider 49 to a projection operation of the dead bolt to lock the vehicle door 1a. When the slider 49 is moved in the other direction (direction of arrow R2 in FIG. 7) from the neutral position, the transmission mechanism converts the movement to a retraction operation of the dead bolt to unlock the vehicle door 1a.

Figure 9:
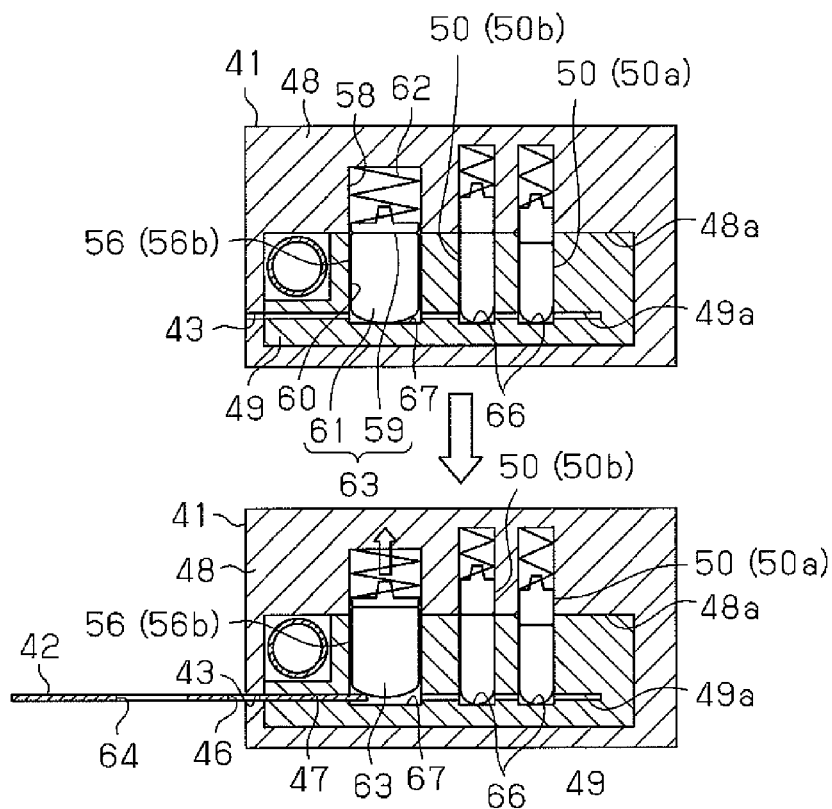
FIG. 9 is a cross-sectional view of a second lock piece in states before and during insertion of the card key.
Figure 10:
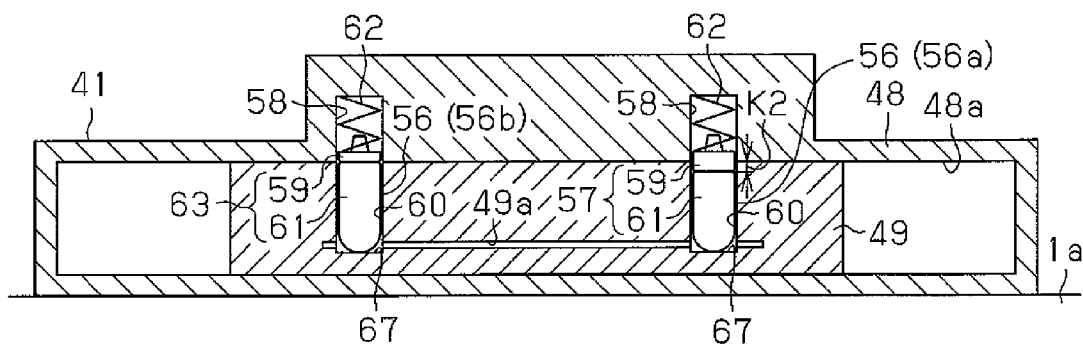
FIG. 10 is a cross-sectional view of a lock piece with a card key.

Referring to FIGS. 9 and 10, the mechanical operation type door lock system 40 includes a lock mechanism 56, which increases the locking strength of the pin tumblers 50 that fixes the slider 49 to the slider case 48. The lock mechanism 56 will now be described. The lock mechanism 56 includes a key non-insertion actuation lock mechanism 56a and a key insertion actuation lock mechanism 56b. The key non-insertion actuation lock mechanism 56a functions during a key non-insertion period in which the card key 42 is not inserted into the lock apparatus 41. The key insertion actuation lock mechanism 56b functions during a key insertion period (key insert operation) from when the card key 42 enters the lock apparatus 41 to just before the card key 42 becomes fully inserted in the lock apparatus 41.

The key non-insertion actuation lock mechanism 56a includes a pin-shaped first lock piece 57. The first lock piece 57, which basically has the same structure as the pin tumblers 50, includes a plunger piece 59, a slider piece 61, and a lock piece spring 62. The plunger piece 59 is movable relative to a first receptacle 58 formed in the slider case 48. The slider piece 61 is movable relative to a second receptacle 60 formed in the slider 49. The lock piece spring 62 constantly biases the plunger piece 59 (in some cases, the slider piece 61 and the plunger piece 59) toward the slider 49. The first lock piece 57 may be parallelepiped. It is preferable that the first lock piece 57 be wider than the pin tumblers 50. The slider piece 61 may have a distal end formed by round surface, for example, a semispherical surface. If the slider piece 61 has a distal end with such a shape, the card key 42 can smoothly lift the slider piece 61 when inserted into the lock apparatus 41. The plunger piece 59 corresponds to a second piece, the slider piece 61 is one example of a first piece, and the lock piece spring 62 is one example of a lock reinforcement biasing member.

The key insertion actuation lock mechanism 56b includes a pin-shaped second lock piece 63. The second lock piece 63, which basically has the same structure as the first lock piece 57, includes a plunger piece 59, a slider piece 61, and a lock piece spring 62. The plunger piece 59 of the second lock piece 63 is shorter than the plunger piece 59 of the first lock piece 57. The slider piece 61 of the second lock piece 63 is longer than the slider piece 61 of the first lock piece 57. The first lock piece 57 and the second lock piece 63 is one example of lock pieces.

As illustrated in FIGS. 2 and 3, the card key 42 includes an opening 64 formed at a position spaced from the code pattern region 45. The opening 64 receives the second lock piece 63 (specifically, the distal portion of the slider piece 61) when the card key 42 is fully inserted in the lock apparatus 41. The opening 64 may be tetragonal in correspondence with the cross-sectional shape of the second lock piece 63. However, the opening 64 may have any shape as long as it can receive the second lock piece 63. The card key 42 includes covered portion 65 located at a position that faces toward the first lock piece 57 when the card key 42 is fully inserted in the lock apparatus 41. The covered portion 65 is not open. When the card key 42 becomes fully inserted in the lock apparatus 41, the covered portion 65 lifts the first lock piece 57.

As illustrated in FIG. 10, in a state in which the card key 42 is not inserted into the lock apparatus 41, the first lock piece 57 abuts against the slider 49 due to the biasing force of the corresponding lock piece spring 62. When the first lock piece 57 is located at this position, the slider piece 61 of the first lock piece 57 is completed accommodated in the second receptacle 60. Further, the plunger piece 59 of the first lock piece 57 is engaged with both the slider case 48 and the slider 49. Such a state is referred to as the lock piece engagement state. When in the lock piece engagement state, the first lock piece 57 reinforces the plunger pins 52, which hold the slider 49 in a fixed state.

Figure 11:
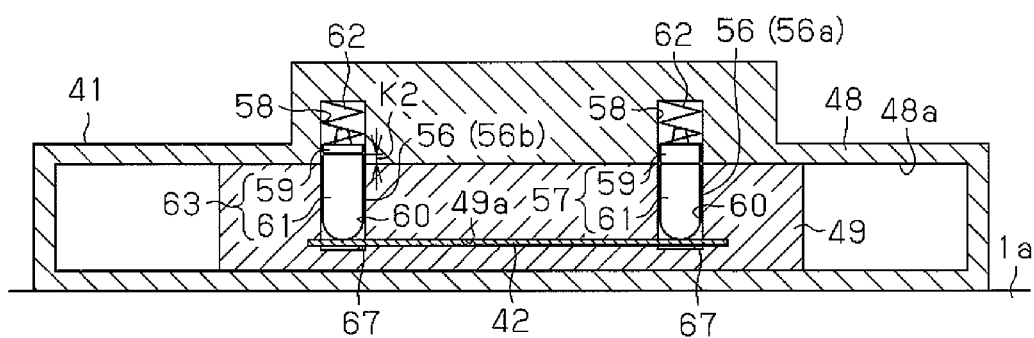
FIG. 11 is a cross-sectional view of the lock piece during insertion of the card key.

As illustrated in FIG. 11, in a state in which the card C key 42 is inserted into the lock apparatus 41, the card key 42 lifts the first lock piece 57 against the biasing force of the lock piece spring 62 by an amount corresponding to an engagement length K2. This aligns the shear line in the first lock piece 57 between the plunger piece 59 and the slider piece 61 with the shear line between the slider case 48 and the slider 49. In this state, the first lock piece 57 does not reinforce the locking strength of the pin tumblers 50. Such a state is referred to as the lock piece disengagement state or the reinforcement cancellation state.

As illustrated in FIG. 10, in a state in which the card key 42 is not inserted into the lock apparatus 41, the second lock piece 63 abuts against the slider 49 due to the biasing force of the corresponding lock piece spring 62. When the second lock piece 63 is located at this position, the basal end of the slider piece 61 of the first lock piece 57, that is, the shear line between the plunger piece 59 and the slider piece 61 is aligned with the shear line between the slider case 48 and the slider 49. Thus, the second lock piece 63 is in the lock piece disengagement state and also in the reinforcement cancellation state in which the locking strength of the pin tumblers 50 is not reinforced. As illustrated in FIG. 11, during a key insert operation, the card key 42 lifts the second lock piece 63 against the biasing force of the lock piece spring 62. The slider piece 61 of the second lock piece 63 engages both the slider case 48 and the slider 49. Thus, the second lock piece 63 is in the lock piece engagement state and reinforces the plunger pins 52, which hold the slider 49 in a fixed state.

Figure 12:
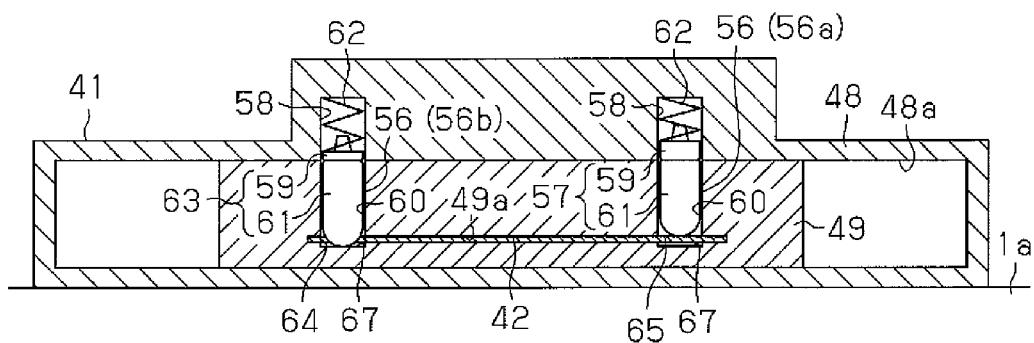
FIG. 12 is a cross-sectional view of the lock piece in a state in which the card key is fully inserted.

As illustrated in FIG. 12, in a state in which the card key 42 becomes fully inserted in the lock apparatus 41, the second lock piece 63 is moved toward the slider 49 by the biasing force of the corresponding lock piece spring 62 and enters the opening 64 in the card key 42. The shear line between the plunger piece 59 and the slider piece 61 is aligned with the shear line between the slider case 48 and the slider 49 (lock piece disengagement state). In this state, the first lock piece 57 is lifted by the covered portion 65 of the card key 42 and maintained in the lock piece disengagement state. Thus, when the card key 42 is fully inserted in the lock apparatus 41, the first lock piece 57 and the second lock piece 63 are both in the reinforcement cancellation state. This permits movement of the slider 49.

As illustrated in FIGS. 4 to 9, the slider 49 has a key slot 49a, which is in communication with the key hole 43. The key slot 49a has a surface that comes into contact with the distal ends of the pin tumblers 50 (bottom surface of key slot 49a). This surface includes a plurality of pin accommodation recesses 66. The distal ends of the pin tumblers 50 (lock pins 54) are accommodated in the corresponding pin accommodation recesses 66. Each pin accommodation recess 66 functions to increase the lift amount of the corresponding pin tumbler 50 and increases the engagement length K1 of the pin tumbler 50. Further, each pin accommodation recess 66 has a depth from the key slot 49a that is determined to maximize the engagement length K1 within a range in which the edge of the card key 42 can enter the gap under the distal end of the lock pin 54 when the card key 42 is inserted into the lock apparatus 41. The depth of each pin accommodation recess 66 is determined so that part of the semispherical distal end of the corresponding lock pin 54 is exposed from the pin accommodation recess 66.

The relationship of the pin accommodation recesses 66 and the key slot 49a is such that the key slot 49a is spaced apart from the bottom of each pin accommodation recess 66 (seat surface that receives the distal end of the corresponding pin tumbler 50) toward the shear line between the slider 49 and the slider case 48. In other words, the key slot 49a extends in the slider 49 at an intermediate height between the bottom of each pin accommodation recess 66 and the shear line between the slider 49 and the slider case 48.

As illustrated in FIGS. 8 to 12, the bottom surface of the key slot 49a in the slider 49 includes seat surfaces, which come into contact with the distal ends of the first lock piece 57 and the second lock piece 63, and lock piece accommodation recesses 67, which are deep enough to partially accommodate the distal ends of the lock pieces 57 and 63 (i.e., the slider pieces 61). In the same manner as the pin accommodation recesses 66, the lock piece accommodation recesses 67 increase the lift amount of the lock pieces 57 and 63 and function to increase the engagement length K2 of the lock pieces 57 and 63. Preferably, the depth of the lock piece accommodation recesses 67 is determined to maximize the engagement length K2 within a range in which the edge of the card key 42 can enter the gap under the distal ends of the lock pieces 57 and 63 when the card key 42 is inserted into the lock apparatus 41. For example, the depth of the lock piece accommodation recesses 67 may be determined so that part of the semispherical distal end of the lock pieces 57 and 63 are exposed from the lock piece accommodation recesses 67. The lock piece accommodation recesses 67 is one example of an accommodation portion.

The relationship of the lock piece accommodation recesses 67 and the key slot 49a is such that the key slot 49a is spaced apart from the bottom of each lock piece accommodation recess 67 (seat surface that receives the distal end of the corresponding lock piece) toward the shear line between the slider 49 and the slider case 48. In other words, the key slot 49a extends in the slider 49 at an intermediate height between the bottom of each lock piece accommodation recess 67 and the shear line between the slider 49 and the slider case 48.

The operation of the mechanical operation type door lock system 40 will now be discussed.

When a driver tries to enter the vehicle 1, which is in a parked state (engine stopped, door locked state), if the key operation-free system 2 fails to function or if battery drainage occurs in the portable device 3, the doors cannot be unlocked with the key operation-free system 2. In such a case, the driver unlocks the vehicle door 1a with the mechanical operation type door lock system 40. The driver may carry the card key 42 of the mechanical operation type door lock system 40 in a wallet, a card case, or the like. The driver inserts the card key 42 into the key hole 43 of the lock apparatus 41. The slider 49 is at the neutral position when the card key 42 is inserted into the lock apparatus 41.

As illustrated in the state of FIG. 4, when the card key 42 is not inserted into the lock apparatus 41, the second pin tumblers 50b are in the pin tumbler disengagement state. However, the first pin tumblers 50a are in the pin tumbler engagement state. The first pin tumblers 50a restrict movement of the slider 49 relative to the slider case 48. Thus, the slider 49 cannot be moved even when a person inserts his or her fingers into the key hole 43 of the lock apparatus 41 to forcibly move the slider 49. In this manner, unauthorized opening and closing of the lock apparatus 41 is prevented.

As illustrated in the states of FIGS. 8 and 10, when the card key 42 is not inserted in the lock apparatus 41, the first lock piece 57 is forced toward the slider 49 by the corresponding lock piece spring 62 and is thus in the lock piece engagement state. The plunger piece 59 of the first lock piece 57 is engaged with both of the slider case 48 and the slider 49 over the engagement length K2. Thus, the slider 49 is fixed to the slider case 48. Further, as illustrated in FIGS. 9 and 10, the second lock piece 63 is forced toward the slider 49 by the corresponding lock piece spring 62 and is thus in the lock piece disengagement state. The shear line between the plunger piece 59 and the slider piece 61 in the second lock piece 63 is aligned with the shear line between the slider case 48 and the slider 49. Thus, in this state the second lock piece 63 does not function to fix the slider 49 to the slider case 48.

In this manner, amount the two lock pieces 57 and 63, the first lock piece 57 fixes the slider 49 to the slider case 48. This reinforces the locking strength of the pin tumblers 50 that fix the slider 49 to the slider case 48. When the card key 42 is not inserted into the lock apparatus 41, the pin tumblers 50 and the first lock piece 57, which is wider than the pin tumblers 50, cooperate to fix the slider 49 to the slider case 48. Accordingly, in a state in which there is no insertion of the card key 42, it is difficult to move the slider 49 even when an unauthorized operation is performed to forcibly move the slider 49.

As illustrated in the states of FIGS. 9 and 11, during a key insert operation, the edge of the card key 42 enters the gap below the distal ends of the lock pieces 57 and 63. As a result, the card key 42 lifts the first lock piece 57 against the biasing force of the corresponding lock piece spring 62 as illustrated in FIG. 11. Thus, the first lock piece 57 shifts from the lock piece engagement state to the lock piece disengagement state. Further, the shear line between the plunger piece 59 and the slider piece 61 in the first lock piece 57 is aligned with the shear line between the slider case 48 and the slider 49. In exchange, the card key 42 lifts the second lock piece 63 against the biasing force of the corresponding lock piece spring 62 as illustrated in FIG. 11. Thus, the second lock piece 63 shifts from the lock piece disengagement state to the lock piece engagement state. Thus, the second lock piece 63 is engaged with both the slider case 48 and the slider 49.

Accordingly, during a key insert operation, the second lock piece 63 takes the place of the first lock piece 57 to reinforce the locking strength for fixing the slider 49 to the slider case 48. During a key insert operation, the pin tumblers 50 and the second lock piece 63, which is wider than the pin tumblers 50, cooperate to fix the slider 49 to the slider case 48. Accordingly, in a state in which a key is being inserted into the lock apparatus 41, it is difficult to move the slider 49 even when an unauthorized operation is performed to forcibly move the slider 49 with an unauthorized key.

When inserting the card key 42 into the key hole 43, the edge of the card key 42 enters the gap below the distal ends of the pin tumblers 50 and thereby lifts the pin tumbler 50. When the card key 42 is completely inserted into the key hole 43, the pin tumblers 50 of the lock apparatus 41 faces the corresponding holes 46 and non-hole portions 47 of the card key 42. If the card key 42 is a proper key, the non-hole portions 47 of the card key 42 are located at positions corresponding to the first pin tumblers 50a, and the holes 46 of the card key 42 are located at positions corresponding to the second pin tumbler 50b, as illustrated in the state of FIG. 5(a).

If the card key 42 is a proper key, each first pin tumbler 50a is forced upward by a distance corresponding to the sum of the plate thickness of the card key 42 and the depth of the pin accommodation recess 66 by the corresponding non-hole portion 47 of the card key 42 against the biasing force of the tumbler spring 55. The shear line between the plunger pin 52 and the lock pin 54 of the first pin tumbler 50a is aligned with the shear line between the slider case 48 and the slider 49 (pin tumbler disengagement state). The second pin tumbler 50b is fitted into the corresponding hole 46 of the card key 42 and thus forced towards the slider 49 by the tumbler spring 55, and the shear line between the plunger pin 52 and the lock pin 54 of the second pin tumbler 50b is aligned with the shear line between the slider case 48 and the slider 49 (pin tumbler disengagement state).

As illustrated in the state of FIG. 12, when the card key 42 is fully inserted in the lock apparatus 41, the opening 64 of the card key 42 becomes aligned with the second lock piece 63. Thus, the second lock piece 63 (specifically, the distal end of the slider piece 61) is moved into the opening 64 of the card key 42 by the urging force of the corresponding lock piece spring 62 and shifted to the lock piece disengagement state. The shear line between the plunger piece 59 and the slider piece 61 of the second lock piece 63 is aligned with the shear line between the slider case 48 and the slider 49

Further, when the card key 42 is fully inserted in the lock apparatus 41, the covered portion 65 of the card key 42 is aligned with the first lock piece 57. Thus, the first lock piece 57 is maintained in the lock piece disengagement state. Accordingly, when the card key 42 is fully inserted in the lock apparatus 41, the first lock piece 57 and the second lock piece 63 are both in the lock piece disengagement state. This permits movement of the slider 49 relative to the slider case 48.

In this manner, when the first pin tumbler 50a and the second pin tumbler 50b are in the pin tumbler disengagement state, while the first lock piece 57 and the second lock piece 63 are both in a lock piece disengagement state, the lock apparatus 41 is in a slider movable state in which the slider 49 is movable relative to the slider case 48. The slider 49 can be moved from the neutral position with the card key 42 when the lock apparatus 41 is in the slider movable state. Therefore, if the proper key 42 is inserted into the lock apparatus 41 and moved in one direction (direction of arrow R1 of FIG. 6) to move the slider 49 in that direction (as illustrated in the state of FIG. 6), such movement is transmitted to the dead bolt by the transmission mechanism. This retracts the dead bolt from a projected state and unlocks the vehicle door 1a.

The plunger pin 52 and the lock pin 54 of each of the pin tumblers 50 must be facing toward each other to enable upward and downward movements of the pin tumblers 50. That is, the card key 42 cannot be taken out from the lock apparatus 41 unless the plunger pin 52 and the lock pin 54 of each pin tumblers 50 are facing each other. Therefore, after unlocking the vehicle door 1a, the driver returns the card key 42 to the initial position by moving the slider 49 to the neutral position to remove the card key 42 from the lock apparatus 41. The driver then pulls out the card key 42 from the lock apparatus 41 and enters the vehicle while holding the card key 42. The driver performs card key operations in this manner to enter the vehicle.

When locking the vehicle door 1a with the mechanical operation type door lock system 40, the proper card key 42 is inserted into the lock apparatus 41 in which the slider 49 is located at the neutral position. Then, the driver moves the card key 42 in the other direction (direction of arrow R2 of FIG. 7) to move the slider 49 in the other direction (state illustrated in FIG. 7). In this case, the movement of the slider 49 is transmitted to the dead bolt by the transmission mechanism. This projects the dead bolt from the retracted state to lock the vehicle door 1a. When removing the card key 42 from the lock apparatus 41 after locking the vehicle door 1a, the driver returns the card key 42 to the initial position by moving the slider 49 to the neutral position. Then, the driver pulls out the card key 42 from the lock apparatus 41 in the same manner as when unlocking the vehicle door 1a with the lock apparatus 41.

A case in which an improper key is inserted into the lock apparatus 41 will now be discussed. An improper code key is a card key in which the array of the holes 46 and non-hole portions 47 is not in correspondence with the key code of the proper card key 42. If an improper key is used, during insertion of the key, the second lock piece 63 would shift to a lock engagement state. This reinforces the locking strength of the pin tumblers 50 that fix the slider 49 to the slider case 48.

Figure 13:
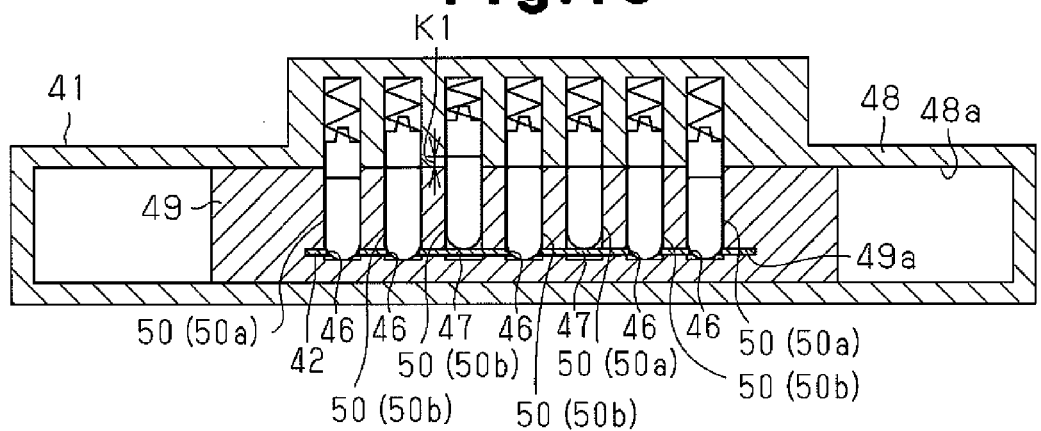
FIG. 13 is a cross-sectional view of the lock apparatus with an improper card key.

If an improper key is fully inserted in the lock apparatus 41, as illustrated in the state of FIG. 13, the holes 46 of the card key 42 may be located at positions facing toward some of the first pin tumblers 50a. Further, the non-hole portions 47 of the card key 42 may be located at positions facing toward some of the second pin tumblers 50b.

The first pin tumblers 50a are each fitted into the corresponding hole 46 and forced towards the slider 49 by the biasing force of the tumbler spring 55 when facing toward the hole 46 of the card key 42. Thus, the first pin tumbler 50a shifts to the pin tumbler engagement state in which the plunger pin 52 is engaged to both the slider case 48 and the slider 49 over the engagement length K1. This restricts movement of the slider 49 relative to the slider case 48. The engagement length K1 in this case corresponds to the lift amount of the plunger pin 52 if a non-hole portion 47 were to face toward a first pin tumbler 50a when inserting the card key 42 into the lock apparatus 41. That is, the engagement length K corresponds to the distance of the sum of the plate thickness of the card key 42 (non-hole portion 47) and the depth of the pin accommodation recess 66.

Further, when each of the second pin tumblers 50b is located at a position facing toward a non-hole portion 47 of the card key 42, the non-hole portion 47 forces the second pin tumblers 50 upward by a distance corresponding to the sum of the plate thickness of the card key 42 and the depth of the pin accommodation recess 66 against the biasing force of the tumbler spring 55. Thus, the second pin tumbler 50b is in the pin tumbler engagement state in which the lock pin 54 engages both the slider case 48 and the slider 49 over the length forced upward by the non-hole portion 47 of the card key 42 as the engagement length K1. This restricts movement of the slider 49 relative to the slider case 48.

Therefore, when one or more of the pin tumblers 50 are in the pin tumbler engagement state, the slider 49 cannot move relative to the slider case 48. Such a state is referred to as a slider immovable state of the lock apparatus 41. The slider 49 cannot be moved from the neutral position using the card key 42 that is inserted into the lock apparatus 41 when the lock apparatus 41 is in the slider immovable state. Thus, the locking and unlocking of the vehicle door 1a cannot be performed if the card key 42 that is inserted into the lock apparatus 41 is an improper key.

Figure 14:
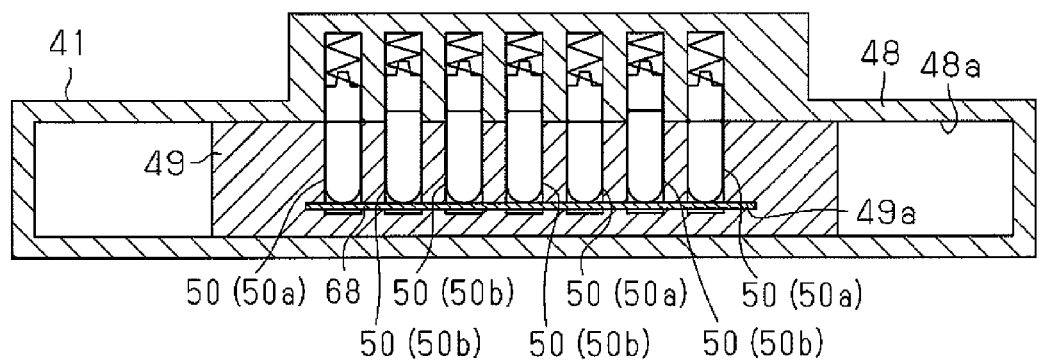
FIG. 14 is a cross-sectional view of the lock apparatus with a plate having no holes.

An example of an unauthorized key operation in which a plain plate member 68 is inserted into the lock apparatus 41 to a forcibly move the slider 49 and attempt unauthorized opening or closing of the lock apparatus 41 will now be discussed with reference to FIG. 14. If the plain plate member 68 is inserted to the lock apparatus 41, the plain plate member 68 force both the first pin tumblers 50a and the second pin tumblers 50b upward against the biasing force of the tumbler springs 55. The first pin tumblers 50a shifts to the pin tumbler disengagement state with the shear line between the plunger pin 52 and the lock pin 54 aligned with the shear line between the slider case 48 and the slider 49. However, the second pin tumblers 50b are in the pin tumbler engagement state in which the lock pins 54 are engaged with the slider case 48 and the slider 49.

If the plain plate member 68 is inserted into the lock apparatus 41 as an unauthorized, or improper, key to perform an unauthorized, or improper, key operation, the second pin tumblers 50b function to fix the slider 49 to the slider case 48. Thus, the second pin tumblers 50b shift the lock apparatus 41 to a slider immovable state. In this manner, even if a third person attempts to perform an unauthorized key operation by inserting the plain plate member 68 into the lock apparatus 41 to forcibly move the slider 49, movement of the slider 49 is disabled. As a result, the lock apparatus 41 does not open when performing an unauthorized key operation with this type of plain plate member 68 in the same manner as when using an improper key.

Further, when inserting the plain plate member 68 into the lock apparatus 41, in the same manner as when inserting a card key 42 (an authorized or proper key) into the lock apparatus 41, the second lock piece 63 takes the place of the first lock piece 57 and shifts to the lock piece engagement state to reinforce the strength of the pin tumblers 50 locking the slider 49. Hence, even when using the plain plate member 68, the second lock piece 63 reinforces the locking strength of the pin tumblers 50 during a key insert operation.

The plate member 68 does not include the opening 64 that corresponds to the lock piece 63. When the plain plate member 68 is fully inserted in the lock apparatus 41, the second lock piece 63 is maintained in a state lifted by the plain plate member 68. Thus, the second lock piece 63 is maintained in the lock piece engagement state. The second pin tumblers 50b and the second lock piece 63, which is wider than the second pin tumblers 50b, cooperate to firmly fix the slider 49 to the slider case 48. Accordingly, even when attempting to perform an unauthorized operation on the lock apparatus 41 with the plain plate member 68, it is difficult to move the slider 49.

In this manner, in this example, the lock pieces 57 and 63, which are wider than the pin tumblers 50, reinforce the strength of the pin tumblers 50 locking the slider 49. This enables the slider 49 to be fixed further firmly to the slider case 48. Thus, if the slider 49 is forcibly moved to operate the lock apparatus 41 when there is no insertion of a key or when an improper key is inserted (plate member is inserted), the slider 49 is prevented from being moved. Thus, it is difficult to perform an unauthorized operation on the lock apparatus 41.

The lock pieces 57 and 63 enable the lock apparatus 41 to be thinner. In such a case, the engagement length K1 of the pin tumblers 50 must be decreased. When the engagement length K1 of the pin tumblers 50 is decreased, the locking strength of the pin tumblers 50 is lowered. However, by using the lock pieces 57 and 63, the locking strength of the pin tumblers 50 can be reinforced while reducing the thickness of the lock apparatus 41.

Further, in this example, the first lock piece 57, which reinforces the locking strength of the pin tumblers 50 when there is no insertion of a key, is used in combination with the second lock piece 63, which reinforces the locking strength of the pin tumblers 50 when there a key is being inserted (unauthorized key is inserted). The locking strength of the pin tumblers 50 can be reinforced not only when there is no insertion of a key but also when inserting a key until it is fully inserted in the lock apparatus 41, when an improper key is inserted into the lock apparatus 41, and when the plain plate member 68 is inserted in the lock apparatus 41. This prevents unauthorized operations of the lock apparatus 41.

The lock apparatus 41, which prevents unauthorized operations, is especially advantageous when used in combination with an electronic key system as an anti-theft device for a vehicle.

The present embodiment has the advantages described below.

(1) The lock mechanism 56 of the lock apparatus 41 reinforces the locking strength of the pin tumblers 50 when the pin tumblers 50 are in the pin tumbler engagement state and fix the slider 49 to the slider case 48. Thus, even when, for example, a third person attempts to forcibly move the slider 49 in an unauthorized manner to open (unlock state) or close (lock state) the lock apparatus 41 in an unauthorized manner, the slider 49 cannot be moved. This prevents unauthorized opening and closing of the lock apparatus 41.

(2) The lock mechanism 56 includes the key non-insertion actuation lock mechanism 56a and the key insertion actuation lock mechanism 56b. Thus, the locking strength of the pin tumblers 50 is reinforced regardless of whether there is not insertion of a key or whether a key is being inserted. This prevents unauthorized opening and closing of the lock apparatus 41.

(3) The lock piece accommodation recesses 67 for partially accommodating the distal ends of the lock pieces 57 and 63 are formed in the key slot 49a of the slider 49 in the surface which the distal ends of the lock pieces 57 and 63 contact. The upward and downward movement amount of the lock pieces 57 and 63 thus includes the depth of the lock piece accommodation recess 67 in addition to the thickness of the card key 42. Thus, the upward and downward movement amount of the lock pieces 57 and 63 is increased by forming the lock piece accommodation recesses 67 in the lock apparatus 41. Further, the longer engagement length K2 of the lock pieces 57 and 63 with the slider case 48 and the slider 49 increases the locking strength of the lock pieces 57 and 63. Therefore, the slider 49 is fixed to the slider case 48 with locking strength of a high level. This further resists improper locking and unlocking operations of the lock apparatus 41.

(4) The lock pieces 57 and 63 are wider than the pin tumblers 50. Thus, a single lock piece (57 or 63) has a greater locking strength then a single pin tumbler 50. Accordingly, the lock pieces 57 and 63 effectively reinforce the locking strength of the pin tumblers 50. This effectively prevents unauthorized opening and closing of the lock apparatus 41.

(5) The card key 42 includes in the code pattern region 45 a key code expressed by the existence and non-existence of holes 46 formed in the card material (plate material). The holes 46 may be replaced with recessed portions having closed bottoms when forming the key code in the card key 42. However, such a card key 42 would have to be thicker to provide sufficient depths for bottomed recesses. Such a thick card key is not preferable. The card key 42 of the preferred embodiment is thin since the holes 46 extend through the card key 42.

(6) The card key 42 may be accommodated in a small space in a wallet or the like. Thus, the card key 42 may be easily carried.

(7) The card key 42 provides an emergency key for the key operation-free system 2, and a mechanical key does not need to be accommodated in the portable device 3 as an emergency key. The emergency key can thus be omitted from the portable device 3, and the portable device 3 can be further miniaturized by the omission of the mechanical key.

(8) When the card key 42 is inserted into the lock apparatus 41, the key insertion actuation lock mechanism 56b functions to position the card key 42 at a location where the case side accommodation holes 51 meet the corresponding slider side accommodation holes 53. This reduces problems caused when the pin tumblers 50 cannot move smoothly and hinder opening of the lock apparatus 41 even though the proper card key 42 has been inserted into the lock apparatus.

It should be apparent to those skilled in the art that the present invention may be embodied in many other specific forms without departing from the spirit or scope of the invention. Particularly, it should be understood that the present invention may be embodied in the following forms.

Figure 15:
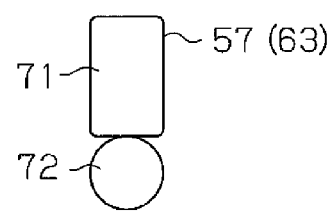
FIG. 15 is a front view of a lock piece of a further example.
Figure 16:
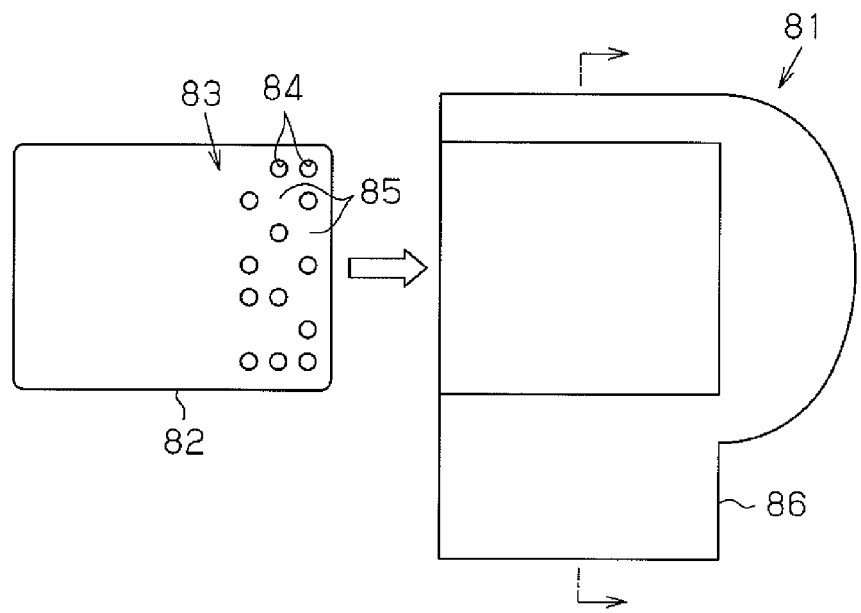
FIG. 16 is a plan view of a card key system in the prior art.
Figure 17:
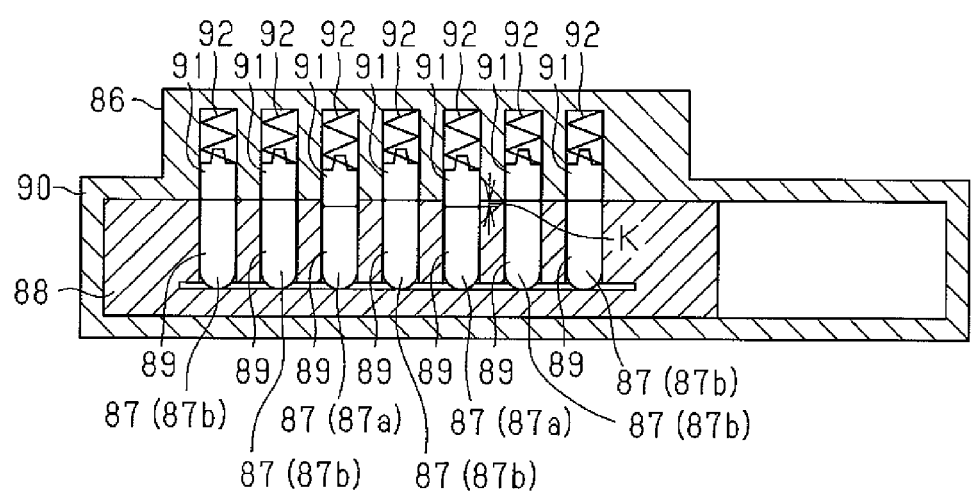
FIG. 17 is a cross-sectional view of a lock apparatus of the card key system illustrated in FIG. 16.
Figure 18:
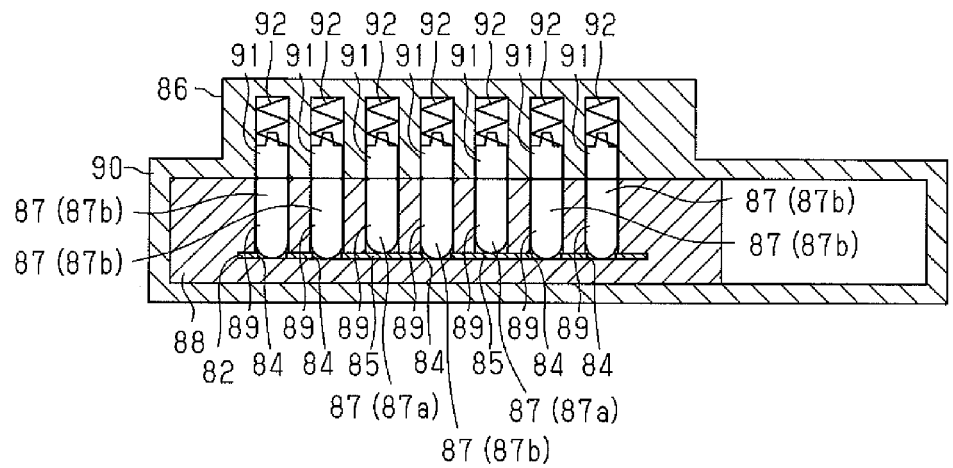
FIG. 18 is a cross-sectional view of the lock apparatus with a proper card key in the prior art.
Figure 19:
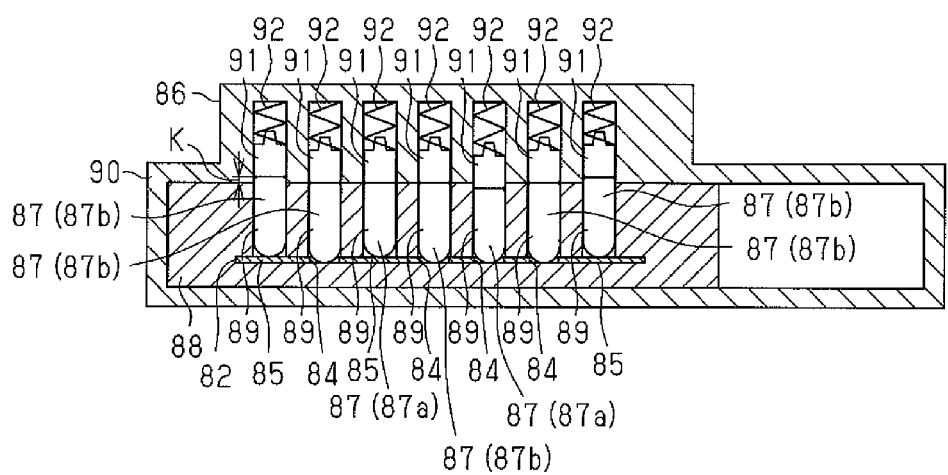
FIG. 19 is a cross-sectional view of the lock apparatus with an improper card key in the prior art.

Each slider piece 61 of the lock pieces 57 and 63 does not have to be a single component and may be formed from a plurality of components as illustrated in FIG. 15. In this case, the slider piece 61 includes a cylindrical body portion 71 and a distal end piece 72, which is a component separate from the body portion 71 and which contacts the card key. The distal end piece 72, which functions to enable smooth insertion of the card key 42 into the lock apparatus 41, is round and may be spherical or cylindrical. The distal end piece 72 may be rotated when inserting the card key 42 into the lock apparatus 41 or when removing the card key 42 from the lock apparatus 41. If the slider piece 61 includes the distal end piece 72, the card key 42 may be smoothly inserted to the lock apparatus 41 so as to reduce resistance during card insertion. The distal end piece 72 is one example of an auxiliary member.

The lock mechanism 56 may be at least one of the key non-insertion actuation lock mechanism 56a and the key insertion actuation lock mechanism 56b.

The lock pieces 57 and 63 do not have to be wider than the pin tumblers 50 and may be set to have any size. Further, the lock pieces 57 and 63 do not have to be parallelepiped in shape and may be cylindrical or have any other shape.

The opening 64 (lock mechanism 56) may be located at other positions, further example, near the distal end of the card key 42 or in the center of the card key 42.

The mechanical key of the mechanical operation type door lock system 40 is not limited to a card key 42, which is extremely thin and plate-shaped like a credit card. The mechanical key may be thicker but smaller than a credit card, in the same manner as a memory card. In this case, the card key 42 may be accommodated in a memory card slot of the portable device of the like. The mechanical key of the mechanical operation type door lock system 40 is not limited to a key body of a card shape and may have a key shape having a slight thickness. The mechanical key may be thinner than a credit card as long as operation of the lock apparatus 41 is possible and may have a thickness that allows flexible bending.

The holes 46 do not have to be through holes and may be recessed portions with closed bottoms. When changing the holes 46 to recessed portions with closed bottoms, it is preferable that every one of the recessed portions be formed on the same surface of the card key 42 so that the lock apparatus 41 can be thin. However, if the lock apparatus 41 does not have to be thin, the recessed portions may be distributed on different surfaces of the card key 42.

The lock apparatus 41 is not limited to a structure for manually moving the slider 49 with the card key 42. An electrical structure for detecting the pin tumbler disengagement state of all the pin tumblers with a sensor and moving the slider 49 with power from the motor and the like may be adopted.

The lock apparatus 41 is not limited to a slide type in which the movable member (slider 49) linearly slides and may be a rotatable type in which the movable member is rotated by a key.

The biasing member for biasing each pin tumbler 50 and lock piece is not limited to a spring and may be a rubber material.

The pin tumblers 50 do not have to all move in the same direction. For example, tumblers movable toward a main surface of the card key 42 and tumblers movable toward a side surface of the card key 42 may be used. In such a case, grooves or notches defining part of a key code are formed in a rim of the card key 42 so that the tumblers movable toward the side surface of the card key verify the grooves or notches.

The activation of the relays 32 to 34 is not limited to electrical management by a power supply ECU 28 and may be a mechanical type in which the relays are switched between activated and deactivated states by the physical operation of the key.

The lock apparatus 41 is not limited to a pin tumbler type including the pin member, and may be a disk tumbler type in which the tumbler member is plate-shaped.

The card key 42 may be an IC card key in which a transponder is embedded. In this case, the immobilizer verification becomes possible with the card key 42.

The electronic key system is not limited to a key operation-free system 2 in which the locking and unlocking of the door and the starting and stopping of the engine are automatically permitted or executed as long as the driver is carrying the proper portable device 3. A wireless key system in which various operation buttons are formed in the electronic key may be used in which an operation request command and key code are transmitted to the vehicle 1 through wireless communication when such a button is pushed.

The engine starting and stopping system of the vehicle 1 is not limited to a one-push engine start system 24 and may be a mechanical operation engine starting and stopping system in which the mechanical key is inserted into the engine starting and stopping key cylinder and turned to start or stop the engine.

The mechanical operation key system using the card key 42 is not necessarily limited to emergency use with the smart entry system 4 and may be used during an emergency of the one-push engine start system 24. The mechanical operation key system using the card key 42 of the preferred embodiment merely needs to be adopted in at least one of the smart entry system 4 or the one-push engine start system 24.

The mechanical operation type door lock system 40 is not limited to a vehicles, and may be used in various components for opening and closing components such as the door of a house and the like.

The pin accommodation recesses 56 can be formed in the slider case 48. In this case, the tumbler springs 55 may be arranged in the slider 49.

The lock piece accommodation recesses 67 can be formed in the slider case 48. In this case, the lock piece springs 62 may be arranged in the slider 49.

The present examples and embodiments are to be considered as illustrative and not restrictive, and the invention is not to be limited to the details given herein, but may be modified within the scope and equivalence of the appended claims.

What is claimed is:

1. A tumbler-type key verification system comprising:
   a tumbler-type key having a code pattern region including an array of one or more recessed portions and one or more non-recessed portions that expresses a key code of the tumbler-type key, wherein the tumbler-type key includes a plurality of holes that are located at a position spaced from the code pattern region and do not express the key code of the tumbler-type key; and
   a lock apparatus into which the tumbler-type key is insertable, the lock apparatus including:
      a support member;
      a movable member movable relative to the support member when the tumbler-type key having a proper key code is inserted into the tumbler-type lock apparatus;
      a plurality of tumblers arranged to be engageable with the support member and the movable member, the plurality of tumblers each corresponding to one of the one or more recessed portions or one of the one or more non-recessed portions during insertion of the tumbler-type key having a proper key code; and
      a plurality of code verification biasing members respectively biasing the plurality of tumblers;
   wherein the tumbler-type key verification system performs verification of the tumbler-type key based on whether the plurality of tumblers are engaged with the support member and the movable member during insertion of the tumbler-type key; and
   the tumbler-type key verification system further comprising at least one lock mechanism for reinforcing the locking strength of the tumblers, the at least one lock mechanism including:
      a plurality of lock pieces corresponding to the plurality of holes that do not express the key code of the tumbler-type key, wherein the lock pieces includes a first lock piece and a second lock piece, each of the first and second lock pieces including a first piece movably accommodated in the movable member and a second piece movably accommodated in the support member;
      a lock reinforcement biasing member which biases the lock pieces; and
      a plurality of lock piece accommodation recesses formed in the movable member or the support member and partially accommodating distal ends of the plurality of lock pieces, respectively,
   wherein the at least one lock mechanism reinforces the locking strength of the tumblers by having the first piece or the second piece engage both the movable member and the support member during at least either one of a state before the tumbler-type key is inserted into the lock apparatus and a state during which the tumbler-type key is being inserted into the lock apparatus, wherein the lock pieces and the lock piece accommodation recesses are configured such that:
      when the plurality of lock piece accommodation recesses partially accommodate the distal ends of the plurality of lock pieces, a shear line between the first and second pieces of the first lock piece is aligned with a shear line between the support member and the movable member while a shear line between the first and second pieces of the second lock piece is not aligned with the shear line between the support member and the movable member; and
      when the tumbler-type key, which is an authorized key, is inserted into the lock apparatus, the distal ends of the first lock piece is partially accommodated in the corresponding lock piece accommodation recess and the shear line between the first and second pieces of the first lock piece is aligned with the shear line between the support member and the movable member while the distal ends of the second lock piece is not accommodated in the corresponding lock piece accommodation recess and the shear line between the first and second pieces of the second lock piece is aligned with the shear line between the support member and the movable member.

2. The tumbler-type key verification system according to claim 1, wherein the at least one lock mechanism includes a key non-insertion actuation lock mechanism and a key insertion actuation lock mechanism;
   the key non-insertion actuation lock mechanism including the second lock piece which reinforces the locking strength of the tumblers by engaging both the movable member and the support member when the tumbler-type key is not inserted into the lock apparatus; and
   the key insertion actuation lock mechanism including the first lock piece which reinforces the locking strength of the tumblers by engaging both the movable member and the support member during a period from when the tumbler-type key is inserted into the lock apparatus and when the tumbler-type key becomes fully inserted in the lock apparatus.

3. The tumbler-type key verification system according to claim 1, further comprising:
   an auxiliary member arranged on a distal end of each lock piece to reduce resistance when inserting the tumbler-type key into a key slot of the lock apparatus.

4. The tumbler-type key verification system according to claim 1, wherein at least one of the lock pieces is wider than the tumblers.

5. The tumbler-type key verification system according to claim 1, wherein:

the tumbler-type key verification system is for use with a vehicle electronic key system;

the electronic key system includes an electronic key capable of transmitting a key code of the electronic key through wireless communication;

the vehicle electronic key system permits or executes operations of a vehicle when the key code of the electronic key is proper;

the vehicle is operable by the operation of an emergency key; and the key code of the tumbler-type key is set as a key code of the emergency key.

6. The tumbler-type key verification system according to claim 1, wherein:

the movable member or the support member includes a key slot into which the tumbler-type key is inserted;

each lock piece accommodation recess includes a bottom which comes in contact with the distal end of the corresponding lock piece; and the key slot is formed at a position spaced apart from the bottoms of the lock piece accommodation recesses toward the shear line between the movable member and the support member.

7. The tumbler-type key verification system according to claim 1, wherein the one or more recessed portions is a hole extending through the tumbler-type key.

8. The tumbler-type key verification system according to claim 1, wherein the tumbler-type key is a card key.

9. The tumbler-type key verification system according to claim 1, wherein when the tumbler-type key is fully inserted in the lock apparatus:

one of the lock piece accommodation recesses partially accommodates the distal end of the first lock piece that has passed through the corresponding hole of the tumbler-type key;

the first piece of the first lock piece is completely accommodated in the movable member such that the first piece of the first lock piece does not engage with the support member; and the second piece of the first lock piece is completely accommodated in the support member such that the second piece of the first lock piece does not engage with the movable member.

* * * * *